(12) United States Patent
Hibata et al.

(10) Patent No.: US 7,828,391 B2
(45) Date of Patent: Nov. 9, 2010

(54) SEAT BELT DEVICE

(75) Inventors: Ganta Hibata, Kanagawa (JP); Mitsuhide Kobari, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 564 days.

(21) Appl. No.: 10/577,287

(22) PCT Filed: Oct. 22, 2004

(86) PCT No.: PCT/JP2004/015730

§ 371 (c)(1), (2), (4) Date: Apr. 28, 2008

(87) PCT Pub. No.: WO2005/039941

PCT Pub. Date: May 6, 2005

(65) Prior Publication Data

US 2008/0203806 A1 Aug. 28, 2008

(30) Foreign Application Priority Data

Oct. 24, 2003 (JP) .............................. 2003-364489

(51) Int. Cl.
B60R 22/00 (2006.01)

(52) U.S. Cl. ..................................... 297/474

(58) Field of Classification Search ................ 297/474, 297/478; 242/382.2
See application file for complete search history.

(56) References Cited

U.S. PATENT DOCUMENTS

| 4,978,087 | A | 12/1990 | Tauber |
| 6,032,092 | A | 2/2000 | Laaser |
| 6,169,479 | B1 | 1/2001 | Boran et al. |

FOREIGN PATENT DOCUMENTS

| EP | 0 315 955 | | 11/1988 |
| EP | 0 315 955 | | 8/1990 |
| EP | 0 858 934 | | 8/1998 |
| FR | 2 650 234 | | 7/1990 |
| FR | 2 650 234 | | 2/1991 |
| JP | 01-202553 | | 8/1989 |
| JP | 03-044060 | | 2/1991 |
| JP | 03-044060 U | | 4/1991 |
| JP | 3044060 | * | 4/1991 |
| JP | 03-148350 | | 6/1991 |

(Continued)

Primary Examiner—Joseph F Edell
(74) Attorney, Agent, or Firm—Brinks Hofer Gilson & Lione

(57) ABSTRACT

The seat belt system includes a locking device for locking the retractor having a sensor-weight type acceleration sensor for activating the locking device, a posture controller for controlling a posture of a sensor weight of the sensor-weight type acceleration sensor, an angle detection device for detecting a rotation angle of a backrest, and an interlocking member for allowing the angle detection device to interlock with the posture controller. The angle detection device allows the interlocking member to rotate in accordance with the reclining angle of the backrest. The posture controller F is controlled by means of the rotation of the interlocking member 11 so as to keep the sensor-weight type acceleration sensor horizontal when the reclining angle is within a range where a passenger wears the seat belt and not to interlock with the angle detection device K when the reclining angle is outside of the range.

11 Claims, 6 Drawing Sheets

FOREIGN PATENT DOCUMENTS

| | | |
|---|---|---|
| JP | 07-089412 | 4/1995 |
| JP | 10-226312 | 8/1998 |
| JP | 11-165569 | 6/1999 |
| JP | 2000-079867 | 3/2000 |
| WO | WO00/07027 | 2/2000 |

* cited by examiner

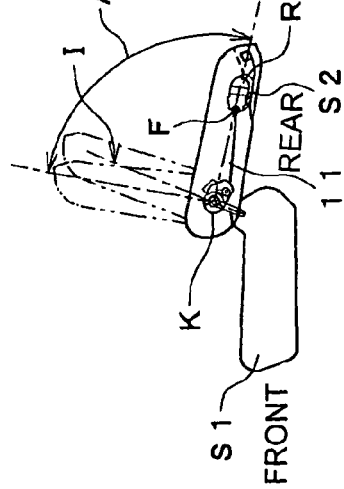
Fig. 2 (a)
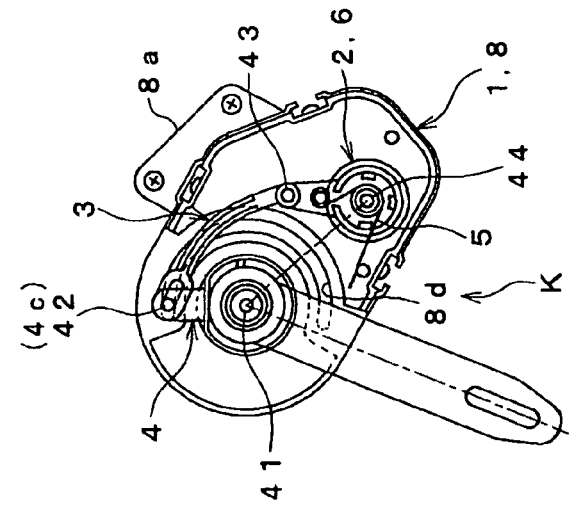
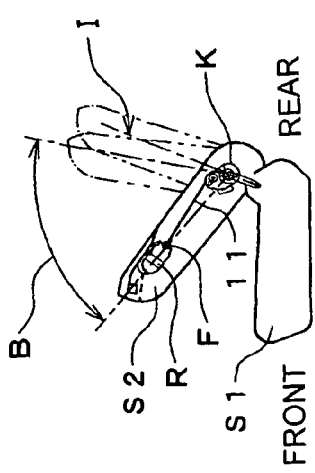
Fig. 2 (b)
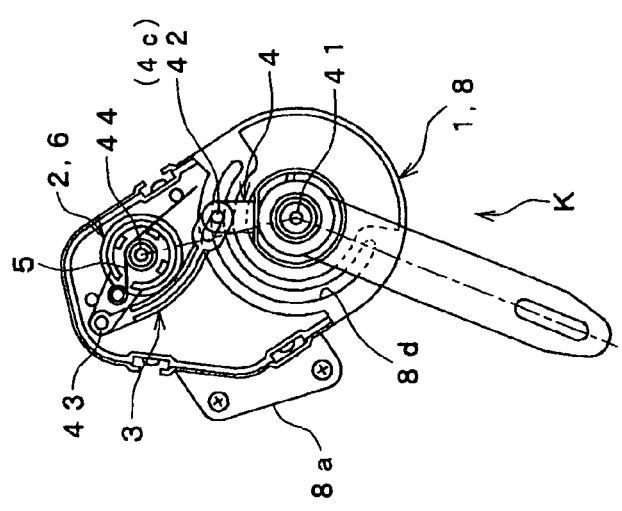
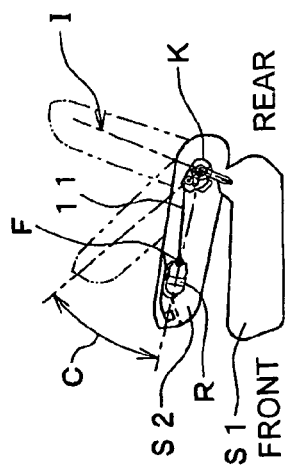
Fig. 2 (c)
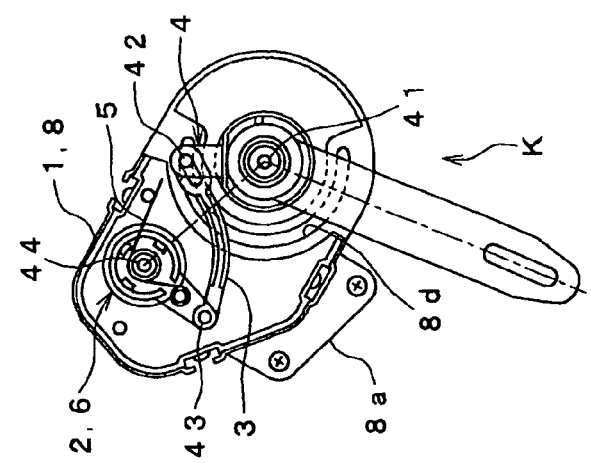

BACKWARD RECLINING ANGLE 80°

SEAT BELT DEVICE

CROSS REFERENCE TO RELATED APPLICATIONS

This application claims priority to Japanese patent application serial number 2003-364489, filed Oct. 24, 2003 and PCT/JP2004/015730, filed Oct. 22, 2004.

FIELD OF THE INVENTION

The present invention relates to a seat belt device for protecting a passenger of a vehicle, and more particularly, to a seat belt device having a seat belt retractor built in a seat backrest.

BACKGROUND AND SUMMARY OF THE INVENTION

A seat belt device is designed to restrain a passenger to a seat of a vehicle by the use of a webbing drawn out from a retractor, thereby protecting the passenger at the time of collision of the vehicle or the like. In the seat belt device, when an acceleration greater than a predetermined value acts in the horizontal direction, a locking device is actuated to stop rotation of a retractor spool.

As an acceleration sensor for detecting the acceleration, there is known an acceleration sensor having a sensor weight which rotates in a reclining direction by means of the acceleration in the horizontal direction and the tilting of the vehicle. In addition, there are known a variety of electrical or electronic acceleration sensors.

By fitting such a seat belt retractor into a seat backrest, the belt can be attached and detached regardless of the reclining angle of the backrest.

However, when the seat belt retractor having the sensor-weight type acceleration sensor is fitted into the backrest and the backrest is reclined in the reclining direction, there is a problem that the sensor weight is also reclined and the locking device is activated. Accordingly, the retractor spool becomes locked and therefore webbing cannot be drawn out.

Therefore, in the retractor mounted in a seat backrest, there have been suggested a variety of mechanisms for keeping the sensor weight horizontal by allowing the sensor-weight type acceleration sensor in the retractor to interlock with the tilt of the backrest. For example, there is known a seat belt device disclosed in the followings.

However, in order to realize a wide operation angle with respect to the reclining angle of the backrest, the conventional seat belt device has a problem in that the number of parts should be increased and an assembly process such as positioning the parts is complicated, thereby increasing the manufacturing cost.

The invention seeks to solve the above-mentioned problem. An object of the invention is to provide a seat belt device which can reduce the manufacturing cost.

In order to accomplish the above-mentioned object, a seat belt device according to a first aspect of the invention includes a seat belt that can be drawn out and wound up so as to restrain a passenger in a vehicle to a seat; a locking device for locking an operation of drawing out the seat belt as needed; an acceleration sensor for actuating the locking device; an angle detection device for detecting a reclining angle of a backrest of the seat; and an acceleration sensor controller.

It is preferable that the sensor controller includes a posture controller for orienting the acceleration sensor in the vertical direction, and an interlocking member for allowing the posture controller to interlock with the angle detection device. It is preferable that the interlocking member may be a flexible cable.

It is preferable that the sensor controller further a sensor deactivator that detects a winding amount of the seat belt when the reclining angle is within the range where the passenger does not wear the seat belt and deactivates the acceleration sensor.

Here, the backrest can be reclined forward and backward, for example, by about 90 degrees with respect to a vertical direction assumed as substantially 0 degree. A position where the backrest is reclined by a predetermined angle with respect to the vertical direction is set as an initial position of the backrest. A range where the passenger does not wear the seat belt is a range where the backrest is reclined forward by about 10 degrees or more from the initial position, and a range where the passenger wears the seat belt is a remaining range.

It is preferable that the backrest of the seat is rotatably connected to a seating portion on which the passenger sits and the acceleration sensor is a sensor-weight type acceleration sensor mounted in the backrest of the seat. Further, it is also preferable that the angle detection device is a link mechanism that is disposed in a connecting portion between the backrest and the seating portion of the seat so as to detect a rotation angle of the backrest and to rotate the interlocking member of the sensor controller in accordance with the reclining angle.

According to the sensor controller, on the basis of the detection result from the angle detection device, the posture controller controls the acceleration sensor to be kept horizontal by means of the rotation of the interlocking member when the reclining angle is within the range where the passenger wears the seat belt, thereby setting the acceleration sensor in an operable state.

The posture controller does not interlock with the angle detection device when the reclining angle is within the range where the passenger does not wear the seat belt, thereby setting the acceleration sensor in an inoperable state by the use of a sensor deactivator.

According to the seat belt device having the above-mentioned configuration, since the link mechanism is used as the angle detection device, it is possible to reduce the number of parts. In addition, a complicated assembly process is not necessary. As a result, it is possible to reduce the manufacturing cost.

According to the sensor deactivator, when the backrest is intended to rise from the range where the passenger does not wear the seat belt, such as the position where the backrest is reclined most forward, to the range where the passenger wears the seat belt, it is possible to avoid the locking to a state that the seat belt cannot be drawn out, due to the actuation of the acceleration sensor.

It is preferable that the angle detection device includes a first detection member, a second detection member, a first link member, and a second link member.

The first detection member is fixed to the seating portion of the seat so as to detect the rotation angle of the backrest. The second detection member is fixed to the backrest so as to detect the reclining angle of the backrest and is connected to the first detection member by means of a first linkage. An end of the first link member is connected to the first detection member by means of a second linkage. An end of the second link member is connected to the other end of the first link member by means of a third linkage, and the other end thereof is connected to the second detection member by means of a fourth linkage.

The rotation of the second link member by the fourth linkage is transmitted to the posture controller through the interlocking member. It is preferable that interlocking member is a flexible cable.

It is also preferable that the angle detection device is housed in the second detection member that also serves as a housing case.

According to the seat belt device having the above-mentioned configuration, it is possible to further reduce the number of parts. In addition, a complicated assembly process is not necessary. As a result, it is possible to further reduce the manufacturing cost.

It is also preferable that the posture controller comprises a sensor-weight casing, a cam groove, and a posture control lever. The sensor-weight casing houses a sensor weight and is pivotably mounted in the backrest. The cam groove is formed in the sensor-weight casing. The posture control lever slides in the cam groove by means of the interlocking member.

The posture control lever slides in the cam groove so as to keep the sensor-weight casing horizontal when the reclining angle is within the range where the passenger wears the seat belt.

The sensor control lever does not interlock with the angle detection device when the reclining angle is within the range where the passenger does not wear the seat belt, thereby not keeping the sensor-weight casing horizontal.

A seat belt device according to a second aspect of the invention includes a seat belt for restraining a passenger in a vehicle to a seat and a retractor for drawing out and winding up the seat belt. The retractor includes a locking device for locking an operation of drawing out the seat belt as needed, an acceleration sensor for actuating the locking device, and a posture controller for controlling a posture of the acceleration sensor. The seat belt device further includes an angle detection device for detecting a rotation angle of a backrest of the seat; and an interlocking member for allowing the posture controller to interlock with the angle detection device.

Here, it is preferable that an initial position of the backrest of the seat is a position where the backrest is reclined backward by a predetermined angle with respect to a vertical direction, and the interlocking member does not interlock within a range where the backrest is reclined forward by about 10 degrees or more from the initial position. It is also preferable that the backrest of the seat is rotatably connected to a seating portion on which the passenger sits and the acceleration sensor is mounted in the backrest of the seat and the angle detection device is a link mechanism that is disposed in a connecting portion between the backrest and the seating portion of the seat so as to detect the rotation angle of the backrest and to rotate the interlocking member in accordance with the reclining angle.

It is also preferable that the posture controller controls the acceleration sensor to be kept horizontal by means of the rotation of the interlocking member when the reclining angle is within the range where the passenger wears the seat belt. On the other hand, it is also preferable that the posture controller does not interlock with the angle detection device when the reclining angle is within the range where the passenger does not wear the seat belt.

It is also preferable that the retractor further comprises a sensor deactivator that detects a winding amount of the seat belt when the reclining angle is within the range where the passenger does not wear the seat belt and deactivates the acceleration sensor.

According to the seat belt device having the above-mentioned configuration, since the link mechanism is used as the angle detection device, it is possible to reduce the number of parts. In addition, a complicated assembly process is not necessary. As a result, it is possible to reduce the manufacturing cost.

According to the sensor deactivator, when the backrest is intended to rise from the range where the passenger does not wear the seat belt, such as the position where the backrest is reclined most forward, to the range where the passenger wears the seat belt, it is possible to avoid the locking to a state that the seat belt cannot be drawn out, due to the actuation of the acceleration sensor.

It is preferable that the acceleration sensor is a sensor-weight type acceleration sensor and the retractor further includes a sensor-weight casing that houses a sensor weight of the acceleration sensor and is pivotably mounted in the retractor and a posture control lever that is activated by the interlocking member. A cam groove in which the posture control lever slides is formed in the sensor-weight casing. The posture control lever slides in the cam groove so as to keep the sensor-weight casing horizontal when the reclining angle is within the range where the passenger wears the seat belt.

DESCRIPTION OF THE DRAWINGS

FIG. 2 is a diagram illustration an operation of an angle detection device.

DETAILED DESCRIPTION OF THE INVENTION

Hereinafter, an embodiment of the invention will be described with reference to the drawings.

Figure 1:
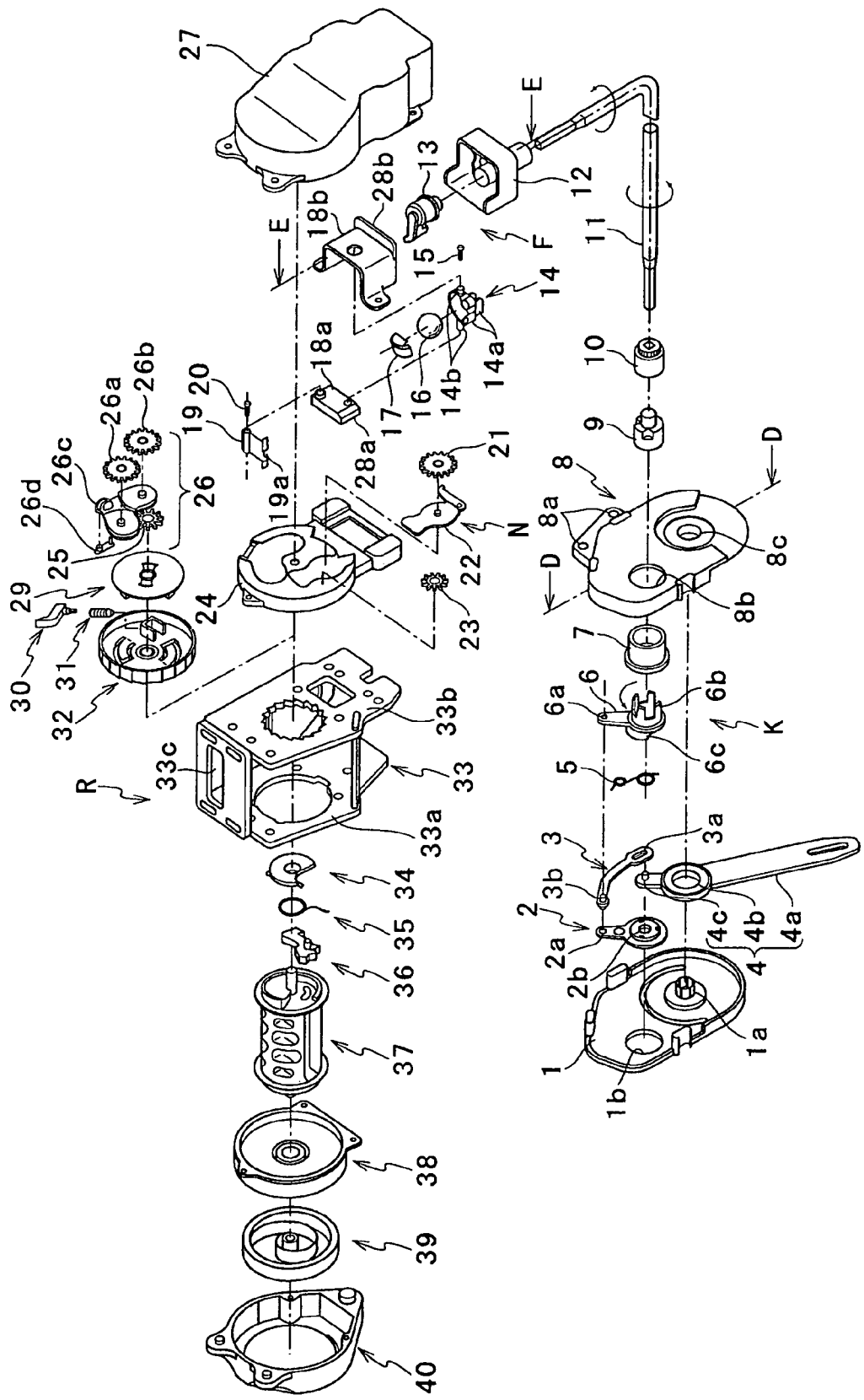
FIG. 1 is an exploded perspective view illustrating a part of an embodiment of the invention.

FIG. 1 is an exploded perspective view illustrating a part of an embodiment of the invention.

The seat belt system of this invention includes a seat belt retractor R shown in FIG. 1 is disposed in a backrest of a seat. As shown in FIG. 1, the seat belt retractor R includes a C-shaped retractor frame 33 having first and second frame sides 33a and 33b and a frame back 33c for connecting the first and second frame sides 33a and 33b to each other. A spindle 37 for winding up a webbing (not shown) constituting a seat belt is suspended between the first and second frame sides 33a and 33b. A retractor spring 39 for biasing the spindle 37 in a direction of winding up the webbing and a spring lower cover 38 and a spring upper cover 40 for housing the retractor spring 39 are disposed outside the first frame side 33a. The seat belt retractor R can draw out and wind up the seat belt for restraining a passenger in a vehicle to a seat.

A locking device for locking the rotation of the spindle 37 in the direction of drawing out the webbing is disposed outside the second frame side 33b. The locking device locks the operation of drawing out the seat belt as needed.

The locking device includes an acceleration sensor, a wheel 32 engaging with a ratchet lever 19 of the acceleration sensor, an inertial member 29 disposed in the wheel 32, a first spring 31 and a pawl 26d disposed between the wheel 32 and the inertial member 29, an assembly 26 for allowing the wheel 32 and the pawl 26d to interlock with each other, a bearing plate 24 for housing the wheel 32, the inertial member 29, a first spring 31, a pawl 26d, and the assembly 26, a locking piece 36, a second spring 35, and a safety plate 34. The assembly 26 includes gears 25, 26a and 26b, an air lever 26c or the like.

The acceleration sensor is a sensor-weight type acceleration sensor for activating the locking device. The acceleration sensor includes a sensor-weight casing 14 for housing a spherical sensor weight 16, a sensor lever 17 rotatably supported by the sensor-weight casing 14, and the ratchet lever 19 which overlaps with the sensor lever 17 and is supported by sensor holders 18a and 18b to be rotatable about an axle 20.

The sensor holders 18a and 18b are mounted on the second frame side 33b of the retractor frame 33 with the bearing plate 24 therebetween. Accordingly, the acceleration sensor is supported by the retractor frame 33 and is installed in the backrest.

The sensor weight 16 is held in the sensor-weight casing 14 to be reclined in the reclining direction. When the sensor weight 16 is reclined, the sensor lever 17 rotates upward, the ratchet lever 19 rotates upward, and thus the claw 19a at the end of the ratchet lever 19 engages with the teeth on the outer circumference of the wheel 32. In addition, the sensor lever 17 is supported by the axle 15 in a pair of sensor lever holding portions 14a raised from the sensor-weight casing 14.

A posture controller F for orienting the acceleration sensor in the vertical direction is provided. The posture controller F includes the sensor-weight casing 14, a cam groove 14c (see FIGS. 5A and 5B) formed in the sensor-weight casing 14, and a posture control lever 13.

The sensor-weight casing 14 has a pair of convex axes 14b which are concentric in the horizontal direction. By inserting the convex axes 14b into holding holes 28a and 28b formed in the sensor holders 18a and 18b, the sensor-weight casing 14 is fitted to the sensor holder 18a and 18b to be pivotable about the convex axles 14b in the horizontal direction. The sensor-weight case 14 is pivotably disposed in the backrest by way of the sensor holders 18a and 18b.

An end of the posture control lever 13 for keeping the sensor-weight casing 14 horizontal to correspond to the reclined angle of the backrest is connected to the cam groove 14c of the sensor-weight casing 14. An end of the flexible cable 11 is connected to the other end of the posture control lever 13. The posture control lever 13 is housed in an adapter 12.

A sensor deactivator N for detecting the winding amount of the belt within the range where the passenger does not wear the seat belt and deactivating the acceleration sensor is provided. The sensor deactivator includes a first gear 21, a switch lever 22, a second gear 23, and a third gear 25. The third gear 25 constitutes a part of the assembly 26.

The elements of the second frame side 33b are housed in a mechanism cover 27 and are fitted to the second frame side 33b of the retractor frame.

The flexible cable 11 is an interlocking member for allowing the angle detection device K for detecting the rotation angle of the backrest to interlock with the posture controller F and is protected by a sleeve.

The angle detection device K includes a first detection member 4, a second detection member 1 and 8, a first link member 3, a second link member 2 and 6, and a torsion spring 5, and serves to detect the reclining angle of the backrest of the seat. Specifically, the backrest of the seat is rotatably connected to the seating portion and the angle detection device K is provided in the connecting portion therebetween so as to detect the rotation angle of the backrest.

The angle detection device K is a link mechanism for allowing the flexible cable 11 as the interlocking member to rotate in accordance with the rotation angle of the backrest. By means of the rotation of the interlocking member, the posture controller F is controlled to keep the sensor-weight type acceleration sensor horizontal when the reclining angle is within the range where the passenger wears the seat belt and not to interlock with the angle detection device K when the reclining angle is within the range where the passenger does not wear the seat belt.

The first detection member 4 is a constituent lever having a mounting portion 4a to the seating portion of the seat, a hole 4b, and an axle 4c.

The hole 4b constitutes a first linkage 41 along with the second detection member 1 and 8. The axle 4c constitutes a second linkage 42 along with a longitudinal hole 3a of the first link member 3. The first detection member 4 is fixed to the seating portion of the seat through the mounting portion 4a so as to detect the reclining angle of the backrest, that is, the rotation angle of the backrest.

The second detection member 1 and 8 has a transmission housing 8 and a transmission cover 1 covering an opening of the transmission housing 8. The transmission cover 1 and the transmission housing 8 are fitted to each other and house the angle detection device K including the first detection member 4, the first link member 3, the second link member 2 and 6, and the torsion spring 5 therein.

The transmission housing 8 has a mounting portion 8a to the backrest. The transmission cover 1 has an axle 1a protruded inward and a hole 1b. The transmission housing 8 has a hole 8b at a position corresponding to the hole 1b of the transmission cover 1 and a hole 8c coupled to the axle 1a at a position corresponding to the axle 1a of the transmission cover 1.

The holes 1 b and 8b constitute a fourth linkage 44 along with the axis 6b of the second link member 2 and 6. The axle 1a is inserted into the hole 4b of the first detection member 4 and is coupled to the hole 8c of the transmission housing 8. The first detection member 4 is held to be rotatable about the hole 4b between the transmission cover 1 and the transmission housing 8.

The second detection member 1 and 8 is fixed to the backrest of the seat through the mounting portion 8a so as to detect the reclining angle of the backrest, that is, the rotation angle of the backrest.

The first link member 3 is a slightly curved bar having a longitudinal hole 3a and a pair of axles 3b protruded inwardly and outwardly. The axle 4c of the first detection member 4 is inserted into the longitudinal hole 3a, thereby forming a second linkage 42.

The second link member 2 and 6 includes a lever 2 and a flexible shaft lever 6 coupled to each other. Both have holes 2a and 6a at positions corresponding to each other, respectively. The axle 3b protruded inwardly and outwardly from the first link member 3 are inserted into the holes 2a and 6a, thereby forming a third linkage 43.

A hole 2b is formed at the other end of the lever 2 and axle 6b and 6c protruded inwardly and outwardly are formed in the other end of the flexible shaft lever 6 at the position corresponding to the hole 2b of the lever 2. The hole 2b of the lever 2 and the axle 6c of the flexible shaft lever 6 are coupled to each other with the torsion spring 5 therebetween. The axle 6b is inserted into the hole 8b of the second detection member 8 through a guide bush 7, thereby forming a fourth linkage 44.

The axle 6b is connected to the other end of the flexible cable 11, which is an interlocking member, through a bushing 9 and a press mount bushing 10. The rotation of the second link member 2 and 6 in the fourth linkage 44 is transmitted to the flexible cable 11 as the interlocking member through the axle 6b of the flexible shaft lever 6 and then is transmitted to the posture controller F.

The posture controller F, the interlocking member 11, and the sensor deactivator N constitute the sensor controller.

On the basis of the detection result of the angle detection device K, the sensor controller controls the posture controller F to keep the sensor-weight casing 14 of the sensor-weight type acceleration sensor horizontal by the use of the rotation of the interlocking member 11 when the reclining angle is within the range where the passenger wears the seat belt. Accordingly, the acceleration sensor is turned to an operable state.

The sensor controller allows the angle detection device K and the posture control mechanism F not to interlock with each other when the reclining angle is within the range where the passenger does not wear the seat belt. Accordingly, the acceleration sensor is turned to an inoperable state.

A detailed operation of the angle detection device K is described now with reference to FIG. 2. The lower part of FIG. 2 is a cross-sectional view of the angle detection device K taken along Line D-D of FIG. 1. The seat includes a seating portion S1 on which the passenger sits and a backrest S2 that can be reclined with respect to the seating portion S1. The backrest of the seat S2 is rotatably connected to the seating portion S1 on which the passenger sits.

The upper part of FIG. 2 indicates the rotation angle of the backrest S2 with respect to the seating portion S1 of the seat, where the rotation angle is detected by the angle detection device K at the lower part. In FIG. 2, reference numerals 41, 42, 43, and 44 denote the first, second, third, and fourth linkages, respectively. Reference numeral I denotes an initial position of the backrest S2. Reference numeral A in FIG. 2C denotes a range where the passenger wears the seat belt, that is, a range where the operation of the acceleration sensor is necessary, and reference numerals B and C in FIGS. 2A and 2B denotes ranges where the seat is reclined forwardly and thus the passenger does not sit on the seat and does not wear the seat belt, that is, ranges where the operation of the acceleration sensor is not necessary.

Specifically, the backrest S2 can be tilted forwardly and backwardly by about 90 degrees with respect to the vertical direction assumed as about 0 degree. A position tilted backwardly by about 15 degrees about the vertical direction is set as the initial position. The range where the passenger does not wear the seat belt means a range where the reclining angle of the backrest is tilted forwardly by 10 degrees or more from the initial position I and the range where the passenger wears the seat belt means the remaining range.

The second detection members 1 and 2 also serve as a casing for housing the angle detection device K. Accordingly, for the purpose of easy understanding of the operation of the second detection member 1 and 2 as a link, the first linkage 41 and the fourth linkage 44 are connected by a dot-chained line in FIG. 2.

The fourth linkage 44 is positioned toward the range A where the operation of the acceleration sensor is necessary for the first link member 3 from the initial position I of the backrest.

An arc-shaped groove 8d centered on the fourth linkage 44 is formed inside the transmission housing 8 constituting the second detection member. When the second detection member 1 and 8 rotates about the first detection member 4 by means of the first linkage 41, the axle 4c of the first link member 4 slides in the groove 8d. The groove 8d is formed to allow the second detection member 1 and 8 not to rotate about the first detection member 4 more than required. The torsion spring 5 gives a bias force so as to allow the second link member 2 and 6 not to rotate in an unexpected direction due to the affection of the longitudinal hole 3a of the first link member 3.

When the angle between the seating portion S1 and the backrest S2 of the seat is varied, the angle between the first detection member 4 and the second detection member 1 and 8 is varied. Then, the second link member 2 and 6 rotates.

In the range A where the operation of the acceleration sensor is necessary in FIG. 2C, the second link member 2 and 6 rotates. Accordingly, the flexible cable 11 rotates in the direction of actuating the posture controller F, thereby actuating the posture controller F. The posture controller F keeps the sensor-weight casing 14 horizontal. As a result, in the range A where the operation of the acceleration sensor is necessary, that is, in the range where the passenger wears the seat belt, the acceleration sensor is always kept horizontal, thereby keeping the acceleration sensor in the operable state.

In the range B where the operation of the acceleration sensor is not necessary in FIG. 2B, the second link member 2 and 6 does not rotate and thus the flexible cable 11 does not rotate. The posture controller F does not interlock with the angle detection device K. Since the acceleration sensor is not kept horizontal, the posture controller F is not actuated.

In the range C where the operation of the acceleration sensor is not necessary in FIG. 2A, the second link member 2 and 6 rotates. Accordingly, the flexible cable 11 also rotates. However, since the rotation is not performed in the direction of allowing the posture controller F to interlock with the angle detection device K, the posture controller F does not interlock with the angle detection device K. As a result, since the acceleration sensor is not kept horizontal, the posture controller F is not actuated.

In the ranges B and C where the operation of the acceleration sensor is not necessary, since the posture controller F does not interlock with the angle detection device, the acceleration sensor locks the retractor R by means of the rotation of the backrest S2. Accordingly, a sensor deactivator N for detecting the winding amount of the belt within the ranges B and C where the operation of the acceleration sensor is not necessary, that is, the ranges where the passenger does not wear the seat belt, and deactivating the sensor-weight type acceleration sensor is provided. When the backrest S2 is returned to the initial position I from the most forward tilted position, the locked state of the retractor R can released, thereby drawing out the seat belt.

Figure 3:
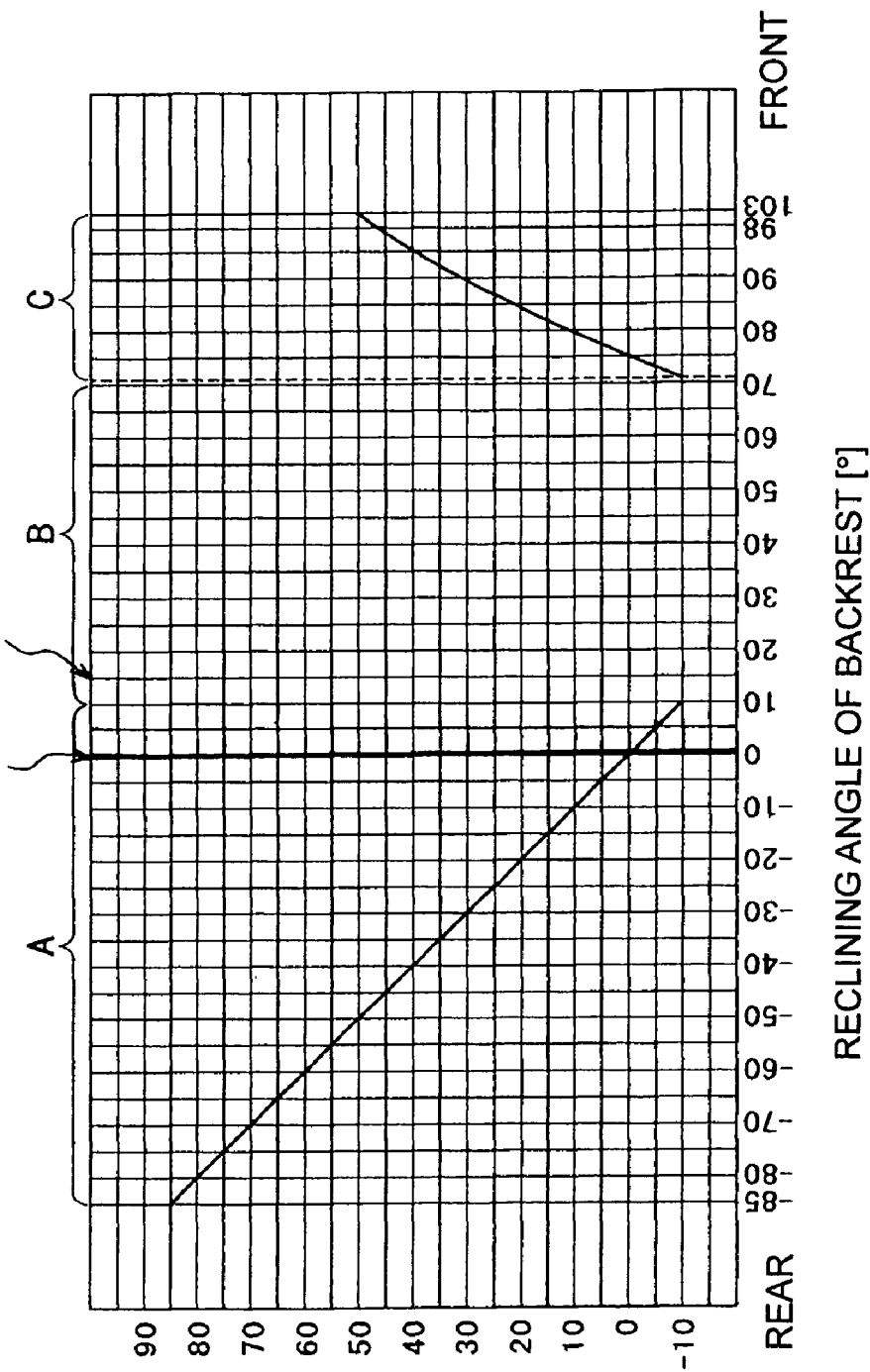
FIG. 3 is a diagram illustrating a graph of a rotation angle of a link (rotation angle of a cable) with respect to a reclining angle (rotation angle) of a backrest.

For the purpose of reference, a graph of the rotation angle of a link (rotation angle of a cable) with respect to the reclining angle (rotation angle) of the backrest is shown in FIG. 3.

Figure 4:
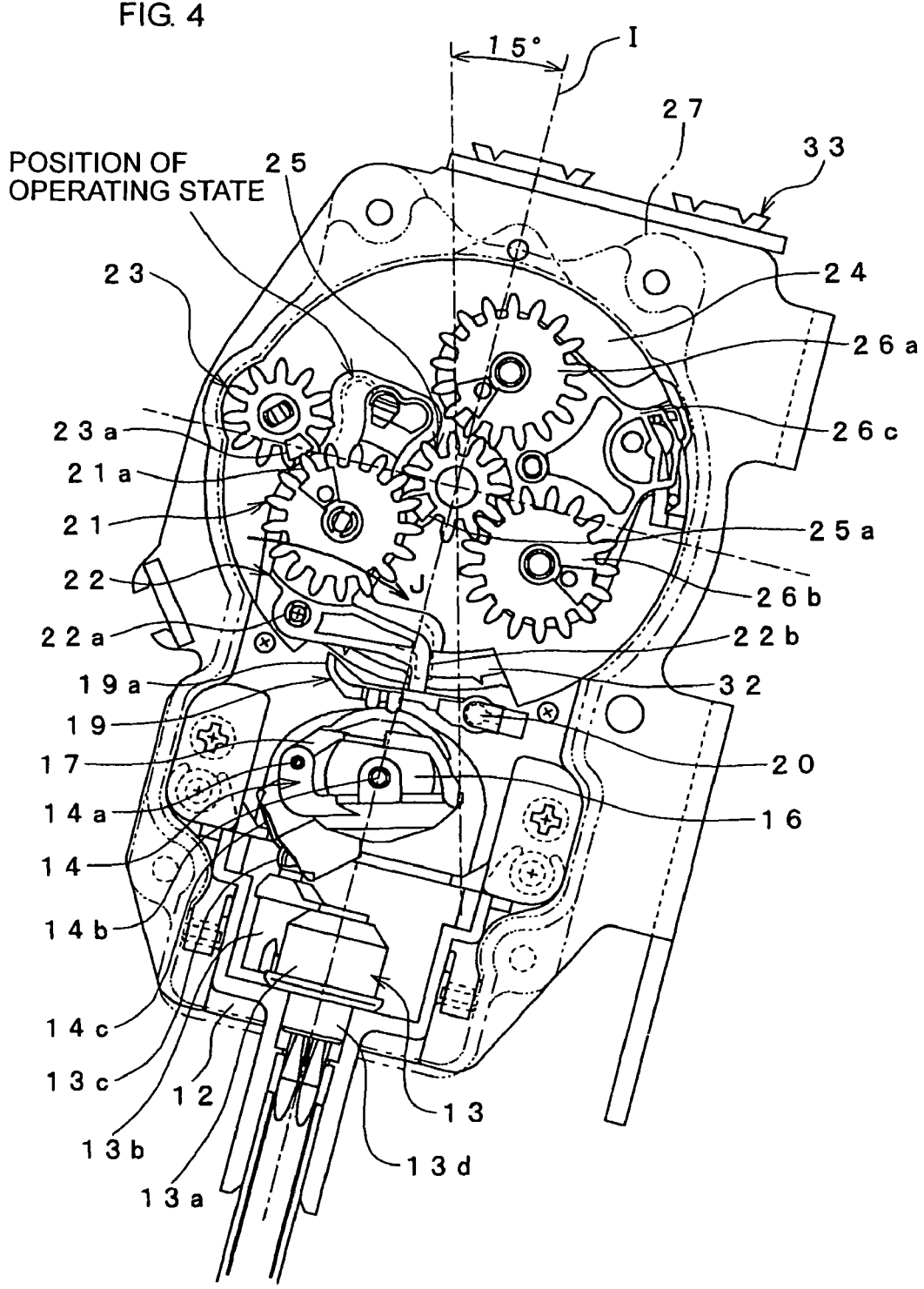
FIG. 4 is a cross-sectional view taken along Line E-E of FIG. 1.
Figure 5A:
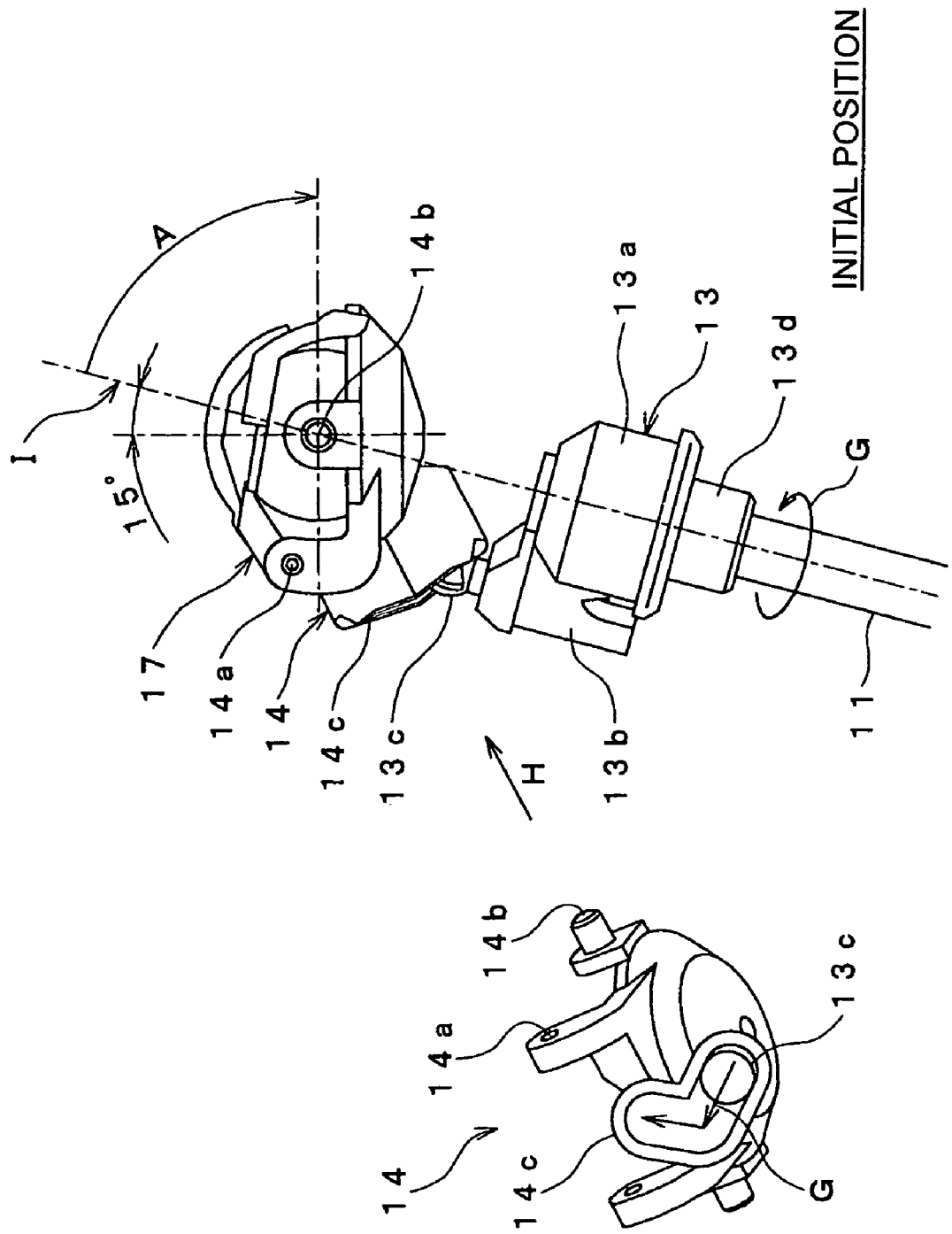
FIG. 5a is a diagram illustrating an operation of a posture controller.
Figure 5B:
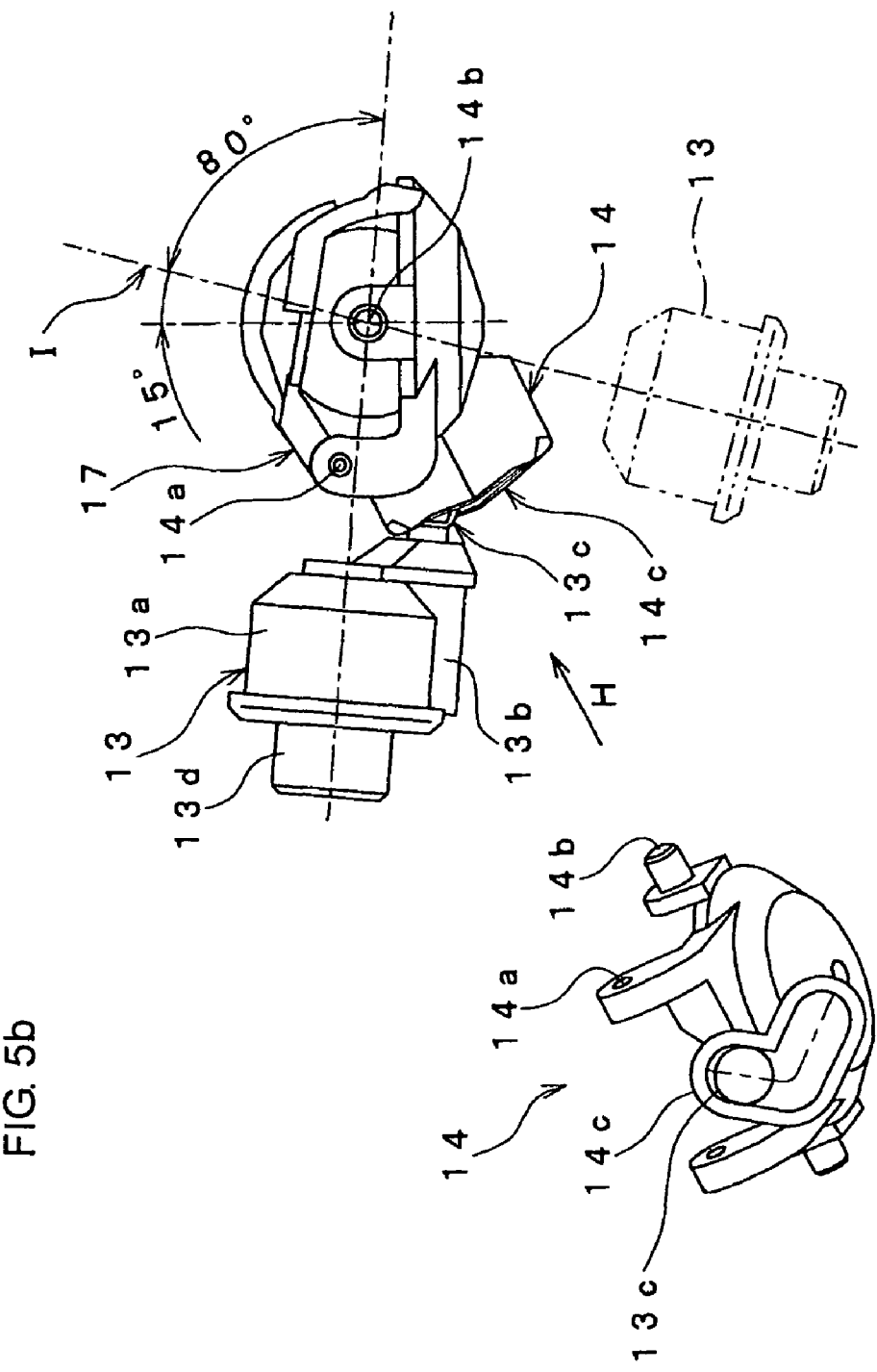
FIG. 5b is a diagram illustrating an operation of a posture controller.

Next, the posture controller F is described with reference to FIGS. 4, 5A, and 5B. FIG. 4 is a cross-sectional view taken along Line E-E of FIG. 1. FIGS. 5A and 5B are diagrams the operation of the posture controller F. In FIGS. 5A and 5B, the left diagram is a perspective view of the sensor-weight casing 14 as seen in the arrow H.

The posture controller F includes the sensor-weight casing 14, the cam groove 14c, and the posture control lever 13, as shown in FIGS. 5A and 5B.

The sensor-weight casing 14 is disposed to be rotatable about the convex axle 14b. The cam groove 14c extends in a V shape on the bottom surface and the side surfaces of the sensor-weight casing 14 for housing the sensor weight 16.

The posture control lever 13 has a body portion 13a having a substantially a cylinder shape, a convex portion 13b protruded in the diameter direction from the body portion 13a, a sphere-shaped portion 13c formed at the upper end of the convex portion 13b, and a cylinder-shaped portion 13d protruded from the bottom of the body portion 13a.

By slidably inserting the sphere-shaped portion 13c of the posture control lever 13 into the cam groove 14c of the sensor-weight casing 14, an end of the posture control lever 13 is connected to the sensor-weight casing 14. An end of the flexible cable 11 is inserted into and connected to the cylinder-shaped portion 13d of the posture control lever 13.

In the range A where the operation of the sensor-weight type acceleration sensor is necessary, as shown in FIG. 5a, the sphere-shaped portion 13c is positioned at the bottom of the sensor-weight casing 14 in the cam groove 14c when the backrest is positioned at the initial position I. With the rotation of the flexible cable 11, the sphere-shaped portion 13c slides in the cam groove 14c in the direction G of keeping the sensor-weight casing 14 horizontal and moves to the lateral surface of the sensor-weight casing 14. Then, the sensor-weight casing 14 pivots about the convex axle 14b, so as to be kept horizontal. The rotation of the flexible cable 11 is a rotation corresponding to the reclining angle of the backrest S2 transmitted from the angle detection device K. Accordingly, in the range A where the operation of the sensor-weight type acceleration sensor is necessary, that is, the range where the passenger wears the seat belt, the sensor-weight casing 14 is kept horizontal to correspond to the reclining angle of the backrest S2. FIG. 5b shows a state that the backrest S2 has rotated by 80 degrees from the initial position I. In this state, the sphere-shaped portion 13c is positioned close to the lateral surface of the sensor-weight casing 14.

In the ranges B and C where the operation of the sensor-weight type acceleration sensor is not necessary, with the rotation of the flexible cable 11, the sphere-shaped portion 13c cannot slide in the cam groove 14c in the direction of keeping the sensor-weight casing 14 horizontal. Accordingly, in the ranges B and C where the operation of the sensor-weight type acceleration sensor is not necessary, that is, the ranges where the passenger does not wear the seat belt, the posture controller F does not interlock with the angle detection device K and thus does not operate.

Next, the sensor deactivator N for detecting the winding amount of the belt in the ranges B and C where the operation of the acceleration sensor is not necessary, that is, the ranges where the passenger does not wear the seat belt, and deactivating the sensor-weight type acceleration sensor will be described with reference to FIG. 4.

The sensor deactivator has a first gear 21, a switch lever 22, a second gear 23, and a third gear 25.

The first gear 21 is fitted to the switch lever 22. The switch lever 22 is fitted to a bearing plate 24 to be rotatable about an axle 22a. The second gear 23 is rotatably fitted to the bearing plate 24. The third gear 25 is fitted to an extension of the axis of the spindle 37. The first gear 21, the second gear 23, and the third gear 25 have protrusions 21a, 23a, and 25a, respectively.

The first gear 21 engages with the second gear 23. The first gear 21 engages with the third gear 25. The third gear 25 transmits the rotary power of the spindle 37 to the first gear 21. The first gear 21 turns the second gear 23.

When the number of rotations of the second gear 23 and the third gear 25 becomes a predetermined number of rotations, that is, a winding amount by which the passenger does not wear the belt, the protrusion 23a of the second gear 23 presses the protrusion 21a of the first gear 21. Accordingly, the switch lever 22 axially supporting the first gear 21 is pressed by the protrusion 21a of the first gear 21 and rotates in the arrow J direction about the spindle 22a. Then, the lower end 22b of the switch lever 22 strongly presses the ratchet lever 19 to the sensor-weight casing 14. Since the claw 19a at the end of the ratchet lever 19 does not engage with the teeth on the outer circumference of the steering wheel 32, the acceleration sensor is changed to the inoperable state.

While the invention has been described with reference to the exemplary embodiment, the invention is not limited to the exemplary embodiment. It will be understood that a variety of modifications would be made therein without departing from the spirit and scope of the invention.

The invention is most suitable as a seat belt device for protecting a passenger of a vehicle.

While the above description constitutes the preferred embodiment of the present invention, it will be appreciated that the invention is susceptible to modification, variation, and change without departing from the proper scope and fair meaning of the accompanying claims.

The invention claimed is:

1. A seat belt system for a vehicle seat having a backrest which can be reclined through a range of reclined angles and having a retractor mounted within the backrest for allowing a seat belt to be drawn out and wound up in the retractor, comprising:

the retractor having a locking device for locking the retractor thereby preventing drawing out of the seat belt;

the retractor having an acceleration sensor for actuating the locking device;

an angle detection device for detecting a reclining angle of the backrest; and a sensor controller responsive to the angle detection device that brings the acceleration sensor into an operable state enabling locking of the retractor when the reclining angle is within the range where the passenger wears the seat belt and brings the acceleration sensor into an inoperable state disabling locking of the retractor by the acceleration sensor when the reclining angle is within a range where the passenger does not wear the seat belt, and wherein the backrest of the seat is rotatably connected to a seat cushion and the sensor controller comprises:

a posture controller for orienting the acceleration sensor in the vertical direction; and an interlocking member for allowing the posture controller to interlock with the angle detection device, wherein the angle detection device is a link mechanism that is disposed in a connecting portion between the backrest and the seat cushion so as to detect the reclined angle of the backrest and to rotate the interlocking member in accordance with the reclined angle, and wherein the posture controller of the sensor controller controls the acceleration sensor to be kept horizontal by means of the rotation of the interlocking member when the reclined angle is within the range where the passenger wears the seat belt, and the posture controller of the sensor controller does not interlock with the angle detection device when the reclining angle is within the range where the passenger does not wear the seat belt.

2. The seat belt system according to claim 1, wherein an initial position of the backrest is a position where the backrest is reclined by a predetermined angle with respect to a vertical direction, and wherein the range of reclining angle where the passenger does not wear the seat belt is a range where the backrest is reclined forward by about 10 degrees or more from the initial position, and the range where the passenger wears the seat belt is a remaining range.

3. The seat belt system according to claim 1, wherein the sensor controller further comprises a sensor deactivator that detects a winding amount of the seat belt on the retractor when the reclining angle is within the range where the passenger does not wear the seat belt and deactivates the acceleration sensor from locking the retractor.

4. The seat belt system according to claim 1, wherein the angle detection device comprises:
   a first detection member that is fixed to the seat cushion so as to detect the reclined angle of the backrest;
   a second detection member that is fixed to the backrest so as to detect the reclined angle of the backrest and is connected to the first detection member by means of a first linkage;
   a first link member having a first link end connected to the first detection member by means of a second linkage; and
   a second link member having a second link end connected to an other end of the first link member by means of a third linkage and the second link other end is connected to the second detection member by means of a forth linkage, and
   wherein the rotation of the second link member by the fourth linkage is transmitted to the posture controller through the interlocking member.

5. The seat belt system according to claim 4, wherein the angle detection device is housed in the second detection member that also serves as a housing case.

6. The seat belt system according to claim 1, wherein the acceleration sensor is a sensor-weight type acceleration sensor,
   wherein the posture controller comprises a sensor-weight casing that houses a sensor weight and is pivotably mounted in the backrest, a cam groove formed in the sensor-weight casing, and a posture control lever that slides in the cam groove by means of the interlocking member, and
   wherein the posture control lever slides in the cam groove so as to keep the sensor-weight casing horizontal when the reclined angle is within the range where the passenger wears the seat belt, and the sensor control lever does not interlock with the angle detection device when the reclined angle is within the range where the passenger does not wear the seat belt.

7. The seat belt system according to claim 1, wherein the interlocking member is a flexible cable.

8. A seat belt system for a vehicle seat having a backrest which can be reclined through a range of reclined angles and having a retractor mounted within the backrest for allowing a seat belt to be drawn out and wound up in the retractor, comprising:
   the retractor having a locking device for locking an operation of drawing out the seatbelt as needed, an acceleration sensor for actuating the locking device, and a posture controller for controlling a position of the acceleration sensor, and
   an angle detection device for detecting a reclined angle of the backrest of the seat; and
   an interlocking member for allowing the posture controller to interlock with the angle detection device, and
   wherein the backrest of the seat is rotatably connected to a seat cushion on which the passenger sits, the acceleration sensor is mounted in the backrest of the seat, the angle detection sensor is a link mechanism that is disposed in a connecting portion between the backrest and the seat cushion so as to detect the reclined angle of the backrest and to rotate the interlocking member in accordance with the reclined angle, and the posture controller controls the acceleration sensor to be kept horizontal by means of the rotation of the interlocking member when the reclined angle is within the range where the passenger wears the seat belt, wherein the posture controller does not interlock with the angle detection device when the reclined angle is within the range where the passenger does not wear the seat belt.

9. The seat belt system according to claim 8, wherein an initial position of the backrest of the seat is a position where the backrest is reclined backward by a predetermined angle with respect to a vertical direction, and the interlocking member does not interlock with the locking device within a range where the backrest is reclined forward by about 10 degrees or more from the initial position.

10. The seat belt system according to claim 8, wherein the retractor further comprises a sensor deactivator that detects a winding amount of the seat belt when the reclined angle is within the range where the passenger does not wear the seat belt and deactivates the acceleration sensor.

11. The seat belt system according to claim 8, wherein the acceleration sensor is a sensor-weight type acceleration sensor,
   wherein the retractor further comprises a sensor-weight casing that houses a sensor weight of the acceleration sensor and is pivotably mounted in the retractor and a posture control lever that is activated by the interlocking member,
   wherein a cam groove in which the posture control lever slides is formed in the sensor-weight casing, and
   wherein the posture control lever slides in the cam groove so as to keep the sensor-weight casing horizontal when the reclined angle is within the range where the passenger wears the seat belt.

* * * * *